Aug. 7, 1956 K. A. MATTHEWS ET AL 2,758,264

ELECTRIC RECTIFIERS

Filed Oct. 29, 1952

Inventor
K. A. MATTHEWS —
R. A. HYMAN
By Philip M. Bolton
Attorney

United States Patent Office 2,758,264

Patented Aug. 7, 1956

2,758,264

ELECTRIC RECTIFIERS

Kenneth Albert Matthews and Robert Anthony Hyman, London, England, assignors to International Standard Electric Corporation, New York, N. Y.

Application October 29, 1952, Serial No. 317,494

Claims priority, application Great Britain November 26, 1951

7 Claims. (Cl. 317—236)

The present invention relates to improvement of electric rectifiers of the kind known as crystal rectifiers.

Crystal rectifiers are of the kind in which a semiconducting crystal of suitable material such as silicon or germanium is provided with a base electrode making low resistance contact over a relatively large area, and a sharply pointed fine wire electrode or catswhisker making rectifying contact with its surface. However, as described in the specification of co-pending British applications Nos. 14429/50 and 21040/50, the catswhisker may be replaced by a metal film of small area applied in a suitable way to the surface of the crystal, to which film a lead-out conductor may be soldered or otherwise firmly attached.

One of the chief advantages of crystal rectifiers over those of the selenium or copper oxide type, is the very much smaller capacity between the electrodes which renders such rectifiers suitable for high frequency applications, or for cases in which the time constant associated with the rectifier is required to be small.

However, the forward resistance of crystal rectifiers is liable to be rather high, and hitherto no satisfactory means has been suggested for reducing the forward resistance without impairing other desirable properties.

For example, it is known that if low resistivity germanium be used as the semiconductor, a rectifier with a few ohms forward resistance and several hundred thousand ohms reverse resistance can be produced without increasing the internal capacity above about 1 micro-micro-farad, but the reverse resistance characteristic is found to be very poor, so that the reverse resistance begins to fall very rapidly when the applied reverse voltage has reached only a few volts. If the reverse resistance is to be maintained at a usefully high value for large reverse voltages, high resistivity germanium must be used, and hitherto it has not been possible to produce rectifiers with very low forward resistance with high resistivity germanium.

The object of the present invention, therefore, is to overcome this difficulty, and this object is achieved according to the invention by providing a rectifying device comprising a semiconducting body having a base electrode making low resistance non-rectifying contact therewith, two rectifying electrodes making contact with the surface of the body, and a single terminal directly connected to both rectifying electrodes, which electrodes are spaced apart by a distance such that the rectification ratio measured between the single terminal and the base electrode is substantially the same as the rectification ratio measured between either rectifying electrode taken by itself, and the base electrode.

The invention will be described with reference to the accompanying drawing, in which.

In the case of a crystal rectifier, the forward resistance cannot be satisfactorily reduced simply by increasing the area of the rectifying contact or electrode, because it will be found that the reverse resistance will be reduced at the same time in a greater ratio, so that the rectification ratio (defined as the ratio of the reverse to the forward resistance for the same applied voltage) is reduced as the contact area is increased. This has been found to be due to a current interaction effect which will be explained with reference to Figs. 1 and 2.

Figure 1:
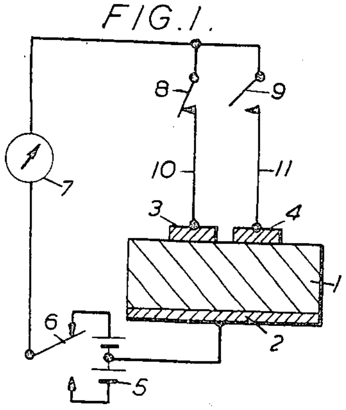
Fig. 1 shows a circuit diagram used to explain the basis of the invention.

Fig. 1 shows a sectional view of a semi-conducting crystal 1 (of germanium, for example) having a base electrode 2 making low resistance contact with its lower surface, and two similar electrodes 3, 4 making rectifying contact with its upper surface. Fig. 1 is diagrammatic and is not intended to indicate the actual relative dimensions or arrangement of the parts. In practice, the electrodes 3 and 4 might be thin metal films each having an area of the order of $10^{-6}$ square inch, for example.

A direct current source 5 has its centre point connected to the base electrode 2. The potential supplied by each half of the source might for example be 0.5 volt. A switch 6 enables one terminal of a low resistance direct current measuring instrument or meter 7 to be connected to the positive or negative terminal of the source 5 as desired. The other terminal of the meter 7 is connected through two further switches 8, 9 and separate conductors 10, 11 to the electrodes 3, 4 respectively.

Let it be assumed that the crystal 1 consists of N-type germanium. If the switches 6, 8 and 9 are in the position shown, the meter 7 will register a current I, given by $E/R_1$, where E is the potential of one-half of the source 5 (0.5 volt), and $R_1$ is the forward resistance of the rectifier 3—1 (neglecting the resistance of the meter 7). If now switch 8 is opened and switch 9 is closed, the meter 7 will register a current $I_2$ given by $E/R_2$ where $R_2$ is the forward resistance of the rectifier 4—1. Generally $I_1$ and $I_2$ will be approximately equal if the electrodes 3 and 4 are of the same area.

If both switches 8 and 9 are closed together, it will be found that the meter 7 now reads a current I which is less than $I_1$, $I_2$, indicating that the resistance of the two rectifiers in parallel is greater than the resistance which would be obtained by connecting two separate resistances R and R in parallel in the normal way. This effect is due to the interaction of the current flowing through the two rectifying contacts, and the magnitude of the effect may conveniently be expressed by means of an interaction factor C defined as $$C(I_1,I_2)/I$$

The factor C decreases asymptotically to the value 1 as the spacing between the electrodes 3 and 4 is increased.

If the switch 6 is operated to the lower contact, a similar phenomenon is observed for the reverse currents, except that these currents are of course very much smaller than the forward currents, and furthermore, the interaction factor C is appreciably less.

It will be evident from this that increasing the area of a single electrode will reduce the reverse resistance much more than the forward resistance of the rectifier, and therefore the forward resistance can only be reduced at the expense of a reduction of the rectification ratio.

Figure 2:
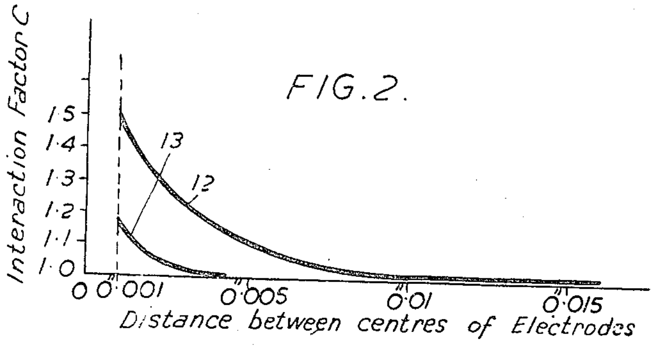
Fig. 2 shows a graphic diagram illustrating the variation of the interaction factor between two adjacent rectifying electrodes.

The graph of Fig. 2 shows the relation betwen the interaction factor (ordinates) and the distance (abscissae) between the centres of electrodes 3 and 4, which are assumed to be circular and of diameter 0.001 inch. Curves 12 and 13 relate respectively to the forward and reverse resistances of the rectifiers. It will be seen that the interaction factor for the reverse resistance practically reaches the minimum value of 1 so long as the separation is greater than about 0.004 inch, but for the forward resistance, the interaction factor does not substantially reach the value 1 until the separation is 0.01 inch or more. Thus in order to halve the forward resistance corresponding to one of the electrodes 3 or 4 without affecting apreciably the rectification ratio, a second similar electrode may be provided on the surface of the crystal so long as its centre is not less than about 0.01 inch from the centre of the first electrode, the two electrodes being connected in parallel. Preferably, in order to provide a further factor of safety, the spacing should be increased to perhaps 0.02 inch. Nothing appreciable will be gained by increasing the spacing further than this.

The curves shown in Fig. 2 are substantially independent of the area of the electrodes 3 and 4, but will be different for different semi-conducting materials. It will be understood that Fig. 2 applies to high resistivity N-type germanium.

This principle may be extended by providing any number of electrodes similar to 3 and 4 on the surface of the same crystal and by connecting them all directly in parallel to a common terminal, so long as no two electrodes have their centres closer than about 0.02 inch. The composite rectifier so formed will then have a forward resistance approximately equal to $1/n$th of the formed resistance of a rectifier with a single electrode, where $n$ is the number of electrodes, but the rectification ratio will be substantially the same as the average rectification ratio for all the electrodes taken singly.

Figure 3:
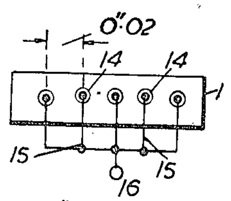
Figs. 3, 4 and 5 show three examples of the manner in which the rectifying electrodes may be arranged according to the invention.
Figure 4:
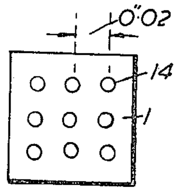
Figure 5:
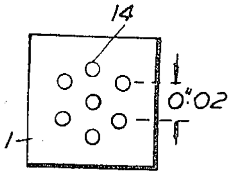

The rectifying electrodes may be arranged, for example, in line, or in square or hexagonal patterns, as shown in Figs. 3, 4 and 5 respectively, the distance between the centres of any two adjacent electrodes being not less than 0.02 inch, for example. As indicated in Fig. 3, all the rectifying electrodes 14 should be connected by suitable wires 15 to a common terminal 16. Similar connections should be used in Figs. 4 and 5 but they have not been shown in order to avoid complicating the figures.

It will be understood that the spacing chosen depends on the requirements. Possibly a small reduction of the rectification ratio (such as 1% for example) might be allowed, in which case the spacing can be reduced so that the value of C as read from curve 12 does not exceed 1.01, for example. Since for spacings greater than about 0.005 the interaction for the reverse resistance is negligible, as shown by curve 13, it is only necessary to consider the interaction for the forward resistance.

Figure 6:
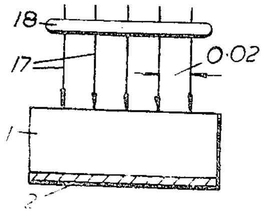
Figs. 6 and 7 respectively show side and end elevations of a rectifier according to the invention employing catswhisker electrodes.
Figure 7:
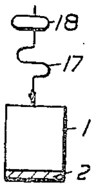

Although the rectifying electrodes have so far been assumed to be metal films of small area, substantially similar interaction effects occur with catswhisker electrodes, and the forward resistance can be reduced in the same way without reducing the rectification ratio by providing a "brush" of catswhiskers arranged in contact with the crystal surface so that two adjacent contact points are not closer than, say, 0.02 inch. An arrangement of this kind is shown in Figs. 6 and 7. The semiconducting crystal 1 with the usual base electrode 2 is provided with any number of fine wire catswhiskers 17 held in a metal strip 18 which forms the common terminal for all the catswhiskers. The catswhiskers should preferably be bent into an S shape, as shown in Fig. 7, in order to provide suitable spring pressure on the surface of the crystal.

It will be understood that in all cases the surface of the semiconducting crystal should be treated in the conventional way in order to obtain good rectification properties, and, generally, the device will be designed and constructed according to well known practice, except as regards the provision of additional electrodes arranged and spaced in the manner explained. The figures of the drawing are not intended to indicate constructional details.

While best results have been obtained with N-type germanium as the semiconducting material, it will be understood that P-type germanium could also be used, or silicon, or other known rectifying crystals.

It will be evident, of course, that if the rectifier has $n$ electrodes connected together in the manner explained, the capacity of the composite rectifier will be approximately $n$ times the capacity obtained with one of the electrodes measured singly.

Attention is directed to British patent specification No. 654,909 in which a rectifying crystal is illustrated with two or more catswhisker electrodes arranged in a line or circle. This arrangement differs from the rectifiers of the present invention in this, that it comprises a series of separate rectifiers separately employed, and accordingly, the catswhiskers cannot be connected in parallel, but each has a corresponding load impedance connected to it. Furthermore, the spacing of the electrodes must be such that there is some current interaction between adjacent electrodes to permit successive priming of the trigger circuits associated with the electrodes as described. In the case of the present invention, this interaction is to be avoided and the spacing of the electrodes will therefore be such that the device would not work in the manner described in specification No. 654,909 if the electrodes were disconnected from one another.

While the principles of the invention have been described above in connection with specific embodiments and particular modifications thereof, it is to be clearly understood that this description is made by way of example and not as a limitation on the scope of the invention.

What we claim is:

1. A rectifying device comprising a semi-conducting body having a base electrode making low resistance, non-rectifying contact therewith, two rectifying electrodes making contact with the surface of the body, and a single terminal directly connected to both rectifying electrodes, which electrodes are spaced apart by a distance whereby the rectification ratio measured between the single terminal and the base electrode is substantially the same as the rectification ratio measured between either rectifying electrode taken by itself, and the base electrode.

2. A rectifying device comprising a body of semi-conducting material having a base electrode making low resistance non-rectifying contact therewith, and two rectifying electrodes directly connected together and making rectifying contact with the surface of the body, said rectifying electrodes being spaced apart by a given distance whereby the interaction factor corresponding to forward currents is substantially equal to 1.

3. A rectifying device comprising a semi-conducting crystal having a base electrode making low resistance non-rectifying contact therewith, and a plurality of rectifying electrodes making rectifying contact with the surface of the crystal, the said rectifying electrodes being directly connected together, and all pairs of adjacent rectifying electrodes being spaced apart by a distance not less than .02 inch whereby the interaction of forward currents passing respectively through the adjacent electrodes is negligible.

4. A rectifying device comprising a semi-conducting crystal of N-type germanium having a base electrode making low resistance non-rectifying contact therewith, a plurality of similar rectifying electrodes making rectifying contact with the surface of the crystal, each rectifying electrode comprising a thin circular metallic film of diameter about 0.001 inch, and means for directly connecting each rectifying electrode to a common terminal, the said rectifying electrodes being spaced apart by a distance of not less than 0.02 inch.

5. A rectifying device according to claim 3 in which the rectifying electrodes comprise sharply pointed wires mechanically and electrically held together to form a brush.

6. A device according to claim 4 in which the rectifying electrodes are arranged in contact with the surface of the crystal in at least one straight line.

7. A device according to claim 6 in which the rectifying electrodes are arranged in contact with the surface of the crystal in a plurality of intersecting lines forming a pattern of squares.

References Cited in the file of this patent

UNITED STATES PATENTS

| | | |
|---|---|---|
| 2,524,035 | Bardeen et al. | Oct. 3, 1950 |
| 2,577,803 | Pfann | Dec. 11, 1951 |
| 2,595,052 | Casellini | Apr. 29, 1952 |
| 2,655,607 | Reeves | Oct. 13, 1953 |
| 2,680,220 | Starr et al. | June 1, 1954 |